United States Patent
Cardinal et al.

(10) Patent No.: US 10,805,342 B2
(45) Date of Patent: Oct. 13, 2020

(54) SYSTEM FOR AUTOMATED MALFEASANCE REMEDIATION

(71) Applicant: Bank of America Corporation, Charlotte, NC (US)

(72) Inventors: Donald Joseph Cardinal, Celina, TX (US); Christopher Daniel Birch, Dayton, OH (US); Shane Edward Asher, San Antonio, TX (US); Travis John Hicks, Cedar Park, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 232 days.

(21) Appl. No.: 16/033,681

(22) Filed: Jul. 12, 2018

(65) Prior Publication Data

US 2020/0021605 A1   Jan. 16, 2020

(51) Int. Cl.
 *H04L 29/06* (2006.01)
 *H04L 29/08* (2006.01)

(52) U.S. Cl.
 CPC ........ *H04L 63/145* (2013.01); *H04L 63/1416* (2013.01); *H04L 67/02* (2013.01)

(58) Field of Classification Search
 CPC .................. H04L 63/1416; H04L 63/145
 See application file for complete search history.

(56) References Cited

U.S. PATENT DOCUMENTS

| | | | |
|---|---|---|---|
| 7,191,210 B2 | 3/2007 | Grossman | |
| 7,457,823 B2 | 11/2008 | Shraim et al. | |
| 8,037,055 B2 | 10/2011 | Brawer et al. | |
| 8,510,286 B1 | 8/2013 | Holfelder et al. | |
| 8,510,411 B2 | 8/2013 | Coulson et al. | |
| 8,533,226 B1 | 9/2013 | Fox et al. | |
| 8,583,482 B2 | 11/2013 | Netzer et al. | |
| 8,990,206 B2 | 3/2015 | Connolly et al. | |
| 9,215,243 B2 | 12/2015 | Bommireddipalli et al. | |
| 2011/0116491 A1* | 5/2011 | Kovacs | H04N 21/4621 370/345 |
| 2012/0324551 A1* | 12/2012 | Bretschneider | G06F 21/45 726/5 |
| 2014/0100948 A1 | 4/2014 | Netzer et al. | |

* cited by examiner

*Primary Examiner* — Jeffrey C Pwu
*Assistant Examiner* — Thong P Truong
(74) *Attorney, Agent, or Firm* — Michael A. Springs; Moore & Van Allen PLLC; Nicholas C. Russell (57) ABSTRACT

Embodiments of the present invention provide a system for automated malfeasance detection. Dedicated communication channels are established between a computing device system of a first entity and a computing device system of a service provider, where the service provider manages, operates, or is otherwise associated with certain web pages. The presence of a malfeasance within one of these web pages of the service provider is detected, and a malfeasance report is generated in response to detecting the malfeasance. This malfeasance report includes an automatic malfeasance remediation action that, when transmitted to the computing device system of the service provider, causes the computing device system of the service provider to automatically execute one or more actions that are responsive to the malfeasance.

17 Claims, 5 Drawing Sheets

SYSTEM FOR AUTOMATED MALFEASANCE REMEDIATION

BACKGROUND

Once a malfeasance is detected in web pages, a party must undertake time consuming tasks (on a case-by-case basis) of identifying which entities and/or individuals must be contacted to report the malfeasance, which form of communication is desired or required, how the malfeasance should be reported, which information should be included in the report, and the like. Additionally, the party detecting the malfeasance does not have real time, or near real time options to directly initiate a removal or other remediation of the malfeasance from a web page. As a web page malfeasance continuously poses security and proprietary concerns, the amount of time it takes to fully remediate a malfeasance is very important to the party detecting the malfeasance, the service provider entity associated with the web page, and the users or potential users of the web page. Therefore, it is beneficial to provide a dedicated communication channel between malfeasance detecting parties and service provider entities, where malfeasance detecting parties are able to cause the service provider entities to automatically initiate or implement remediation action procedures to resolve or eliminate the malfeasance.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for automated malfeasance remediation. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing device system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve establishing a dedicated communication channel between a computing device system of a first entity and a computing device system of a service provider. The system may then determine a presence of a malfeasance associated with a web page that is associated with the service provider and generate a malfeasance report in response to determining the presence of the malfeasance, where the malfeasance report comprises at least a reference to the web page, a description of the malfeasance, and a prompt for executing an automatic malfeasance remediation action. Next, in some embodiments, the system may transmit the malfeasance report from the computing device system of the first entity to the computing device system of the service provider via the dedicated communication channel. Finally, in response to the computing device system of the service provider receiving the malfeasance report, the system may cause the computing device system of the service provider to execute the automatic malfeasance remediation action.

In some embodiments of the system, the step of determining the presence of the malfeasance associated with the web page that is associated with the service provider comprises detecting the malfeasance associated with the web page that is associated with the service provider. In some such embodiments, the step of detecting the malfeasance associated with the web page that is associated with the service provider comprises comparing one or more features of the web page to a set of rules associated with terms and conditions for the web page that are stored in a database, determining that a first feature of the web page violates at least one rule of the set of rules, and designating the first feature of the web page as the malfeasance. In other such embodiments, the system may be configured to transmit a request for confirmation of the presence of the malfeasance to a computing device of a malfeasance detection specialist, and receive the confirmation of the presence of the malfeasance from the computing device of the malfeasance detection specialist.

Additionally or alternatively, the step of determining the presence of the malfeasance associated with the web page that is associated with the service provider comprises receiving a malfeasance notification from a computing device associated with a malfeasance detection specialist that identifies the presence of the malfeasance.

The malfeasance report of the system may additionally comprise a time and date that the presence of the malfeasance was determined, a time and date that the malfeasance began, an image or screen shot of the web page associated with the malfeasance, a justification notification for reporting the malfeasance, and one or more requested malfeasance remediation actions, including the automatic malfeasance remediation action.

Finally, in some embodiments of the system, the automatic malfeasance remediation action comprises at least one of shutting down the web page, shutting down a website associated with the web page, shutting down all websites associated with a registered party of the web page, transmitting a cease and desist notification to a computing device of the registered party of the web page, transmitting, to the computing device of the registered party, a request for an authorization or an explanation regarding the malfeasance from the registered party of the web page, transmitting, to the computing device of the registered party, a request for proof that the malfeasance has been fully remediated, transmit a notification of the malfeasance to a computing device system of a government agency, and transmitting the notification of the malfeasance to a computing device of a user of the web page.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for automated malfeasance remediation. Dedicated communication channels are established between a computing device system of a first entity and a computing device system of a service provider, where the service provider manages, operates, or is otherwise associated with certain web pages. The presence of a malfeasance within one of these web pages of the service provider is detected, and a malfeasance report is generated in response to detecting the malfeasance. This malfeasance report includes an automatic malfeasance remediation action that, when transmitted to the computing device system of the service provider, causes the computing device system of the service provider to automatically execute one or more actions that are responsive to the malfeasance.

Figure 1:
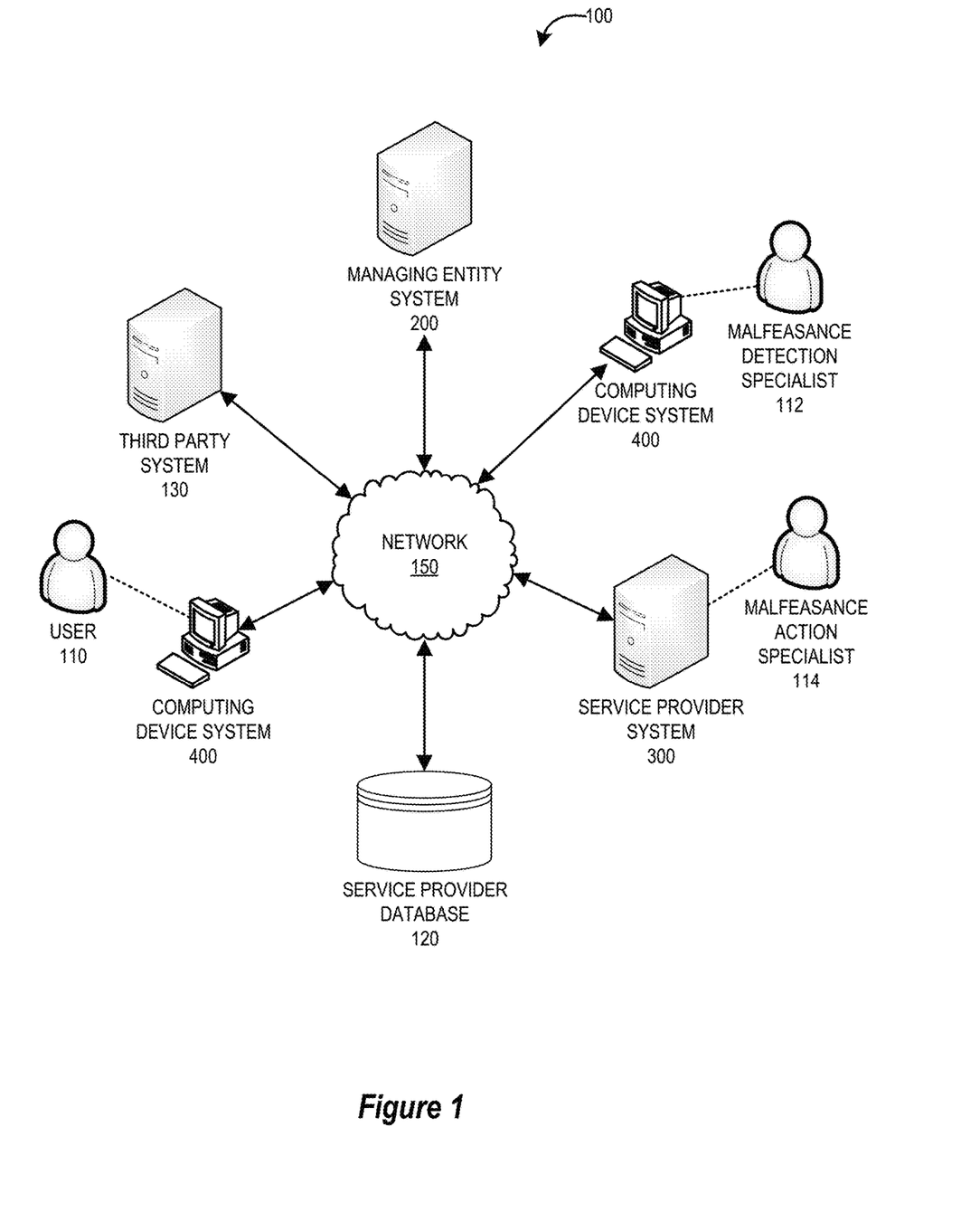
FIG. 1 provides a block diagram illustrating a system environment for automated malfeasance detection, in accordance with an embodiment of the invention.

FIG. 1 provides a block diagram illustrating a system environment 100 for automated malfeasance remediation, in accordance with an embodiment of the invention. As illustrated in FIG. 1, the environment 100 includes a managing entity system 200, a service provider system 300, one or more computing device systems 400, a service provider database 120, and one or more third party systems 130. One or more users 110 may be included in the system environment 100, where the users 110 are individuals that are accessing, or have accessed, one or more web pages associated with the service provider system 300. In some embodiments, one or more of the users 110 comprises an individual that owns the domain name of at least one of the web pages associated with the service provider system 300, and therefore is considered a "registered party."

Additionally, the system environment 100 may include a malfeasance detection specialist 112 that interacts with the network 150 via a user interface of a computing device system 400. The malfeasance detection specialist 112 may be an employee, contractor, or is otherwise associated with the managing entity system 200, and may be specifically trained to identify or detect malfeasances, confirm or clear reported malfeasances, and/or determine suggested or automatic malfeasance response actions for a particular malfeasance found within a web page.

Furthermore, the system environment 100 may include a malfeasance action specialist 114 that interacts with the network 150 via a user interface of a computing device system 400. The malfeasance action specialist 114 may be an employee, contractor, or is otherwise associated with the service provider system 300, and may be specifically trained to execute certain actions that are configured to resolve, mitigate, or escalate certain malfeasances detected within a web page associated with the service provider system 300.

The managing entity system 200, the service provider system 300, the computing device system(s) 400, the service provider database 120, and/or the third party system 130 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the service provider system 300, the one or more computing device systems 400, the service provider database 120, and/or the third party system 130 across the network 150.

For example, the managing entity system 200 may be configured to establish a dedicated communication channel (i.e., a component of the network 150) between one or more entities (e.g., a managing entity associated with the managing entity system 200, a first entity that is not the managing entity, or the like) and the service provider system 300 to facilitate secure, private, and direct communications between the two parties. The managing entity system 200 may additionally or alternatively be configured to determine a presence of a malfeasance associated with a web page that is associated with the service provider system 300, generate a malfeasance report regarding the malfeasance, transmit the malfeasance report to the service provider system 300, and/or cause the service provider system to execute one or more automatic malfeasance remediation actions to resolve, mitigate, or otherwise address the malfeasance of the web page. Of course, the managing entity system 200 may be configured to perform (or instruct other systems to perform) one or more other process steps described herein (e.g., one or more of the process 500 steps described with respect to FIG. 5). The managing entity system 200 is described in more detail with respect to FIG. 2.

The service provider system 300 may be a system owned or controlled by the managing entity and/or a third party that specializes in hosting websites, managing websites, registering users for owning or managing websites, handling data stored in association with websites, and the like. In general, the service provider system 300 is configured to communicate information or instructions with the managing entity system 200, the one or more computing device systems 400, the service provider database 120, and/or the third party system 130 across the network 150.

For example, the service provider system 300 may be configured to establish or host web pages for one or more users 110 (e.g., registered users, web page visitors, application visitors, and the like) across the network 150 (e.g., via the Internet, via an intranet, via a private LAN, or the like). Additionally or alternatively, the service provider system 300 may be configured to establish, populate, update, or otherwise monitor and control the service provider database 120 with information and data associated with terms and conditions of the web pages associated with the service provider system 300, government rules and regulations that apply to the web pages associated with the service provider system 300, and the like. Furthermore, the service provider system 300 may be configured to receive malfeasance reports from the managing entity system 200 or from a computing device system 400 of a user 110 or malfeasance detection specialist 112 and perform one or more automatic malfeasance remediation actions based on the received malfeasance reports. Of course, the service provider system 300 may be configured to perform (or instruct other systems to perform) one or more other process steps described herein. The service provider system 300 is described in more detail with respect to FIG. 3.

The one or more computing device systems 400 in the system environment 100 may computing devices (e.g., desktop computers, workstations, personal computers, or the like), mobile computing devices (e.g., mobile phones, tablet computers, laptop computers, wearable devices, or the like) that are controlled by one or more users 110, a malfeasance detection specialist 112, and/or a malfeasance action specialist 114 to communicate with the other entities and systems of the system environment 100 via the network 150. In general, the computing device systems 400 are configured to communicate information or instructions with the managing entity system 200, the service provider system 300, the service provider database 120, and/or the third party system 130 across the network 150.

For example, a computing device system 400 may be configured to establish or participate in establishing a secure, dedicated communication channel with one or more other computing devices or computer systems in the system environment 100. The computing device systems 400 may additionally or alternatively be configured to receive one or more notifications associated with a malfeasance detected on a web page, and to display the one or more notifications via a user interface, or to communicate the notification to an application associated with that computing device system 400. Of course, a computing device system 400 may be configured to perform (or instruct other systems to perform) one or more other process steps described herein. A sample computing device system 400 is described in more detail with respect to FIG. 4.

The service provider database 120 may comprise a network communication interface, a processing device, and one or more memory devices, where the processing devices are configured to perform certain actions with the memory devices and communicate these actions to the rest of the network 150 through the network communication interface. In general, the service provider database is accessible (e.g., readable, editable, and the like) by the service provider system 300 and/or the managing entity system 200 (e.g., via a computing device system 400). The service provider database 120 may include sets of rules (e.g., terms and conditions for use) for each of the web pages, or websites in general, that are owned, managed, or otherwise overseen by the service provider system. These sets of rules may be general rules that can be interpreted by a malfeasance detection specialist 112 or by a machine learning or artificial intelligence application of a computing device system 400.

In other embodiments, the sets of rules may comprise machine readable code or instructions that are configured to be compared with elements or features of web pages by computing device systems 400 to determine whether the elements or features of the web pages violate terms and conditions of use for the web pages. In some embodiments, the service provider database 120 comprises at least a portion of a block chain network that records the sets of rules in distributed ledgers.

The service provider database 120 may be updated by the service provider system 300 and/or a third party system 130 (e.g., a government agency system) such that the rules are kept up to date and can be changed in real time to help a computing device system 400 identify new types of malfeasance as those types are identified.

The third party system 130 may be any system that interacts with, supports, or otherwise engages with the system environment 100. For example, a third party system 130 may comprise a government regulatory agency, a reporting agency, a computing system of a contractor entity that is performing one or more steps otherwise associated with the managing system entity 200 or the service provider system 300, or the like.

Figure 2:
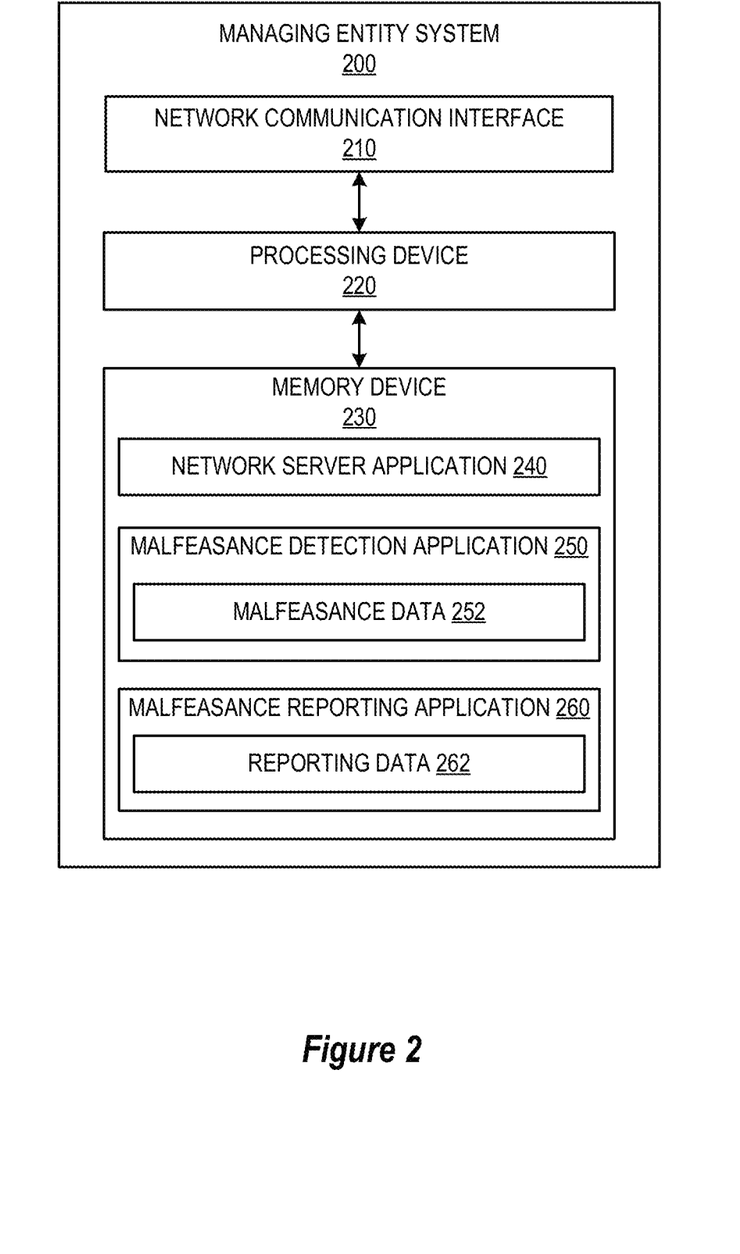
FIG. 2 provides a block diagram illustrating the managing entity system of FIG. 1, in accordance with an embodiment of the invention.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a malfeasance detection application 250 which includes malfeasance data 252, a malfeasance reporting application 260 which includes reporting data 262, and other computer-executable instructions or other data. The computer-executable program code of the network server application 240, the malfeasance detection application 250, and/or the malfeasance reporting application 260 may instruct the processing device 220 to perform certain logic, data-processing, and data-storing functions of the managing entity system 200 described herein, as well as communication functions of the managing entity system 200.

In one embodiment, the malfeasance data 252 of the malfeasance detection application 250 may comprise timestamp information, malfeasance location information, cached web page information or images, monitoring information (e.g., identified changes over time for a web page), and the like, such that the malfeasance detection application 250 is able to analyze web pages for malfeasance and gather information about detected malfeasances that can later be reported.

The reporting data 262 of the malfeasance reporting application 260 may comprise contact information associated with dedicated communication channels to a service provider associated with a web page, desired malfeasance report formats and information types of the service provider, and the like. In this way, the malfeasance reporting application 260 is configured to generate malfeasance reports using the appropriate information or data (i.e., as gathered by the malfeasance detection application 250 and stored as malfeasance data 252), and transmit the malfeasance report to the appropriate service provider via a dedicated and secure communication channel.

The network server application 240, the malfeasance detection application 250, and the malfeasance reporting application 260 are configured to invoke or use the malfeasance data 252, the reporting data 262, and the like when communicating through the network communication interface 210 with the service provider system 300, the one or more computing device systems 400, the service provider database 120, and/or the third party system 130 via the network.

The network communication interface 210 is a communication interface having one or more communication devices configured to communicate with one or more other devices on the network 150, such as the service provider system 300, the one or more computing device systems 400, the service provider database 120, the third party system 130, and the like. The processing device 220 is configured to use the network communication interface 210 to transmit and/or receive data and/or commands to and/or from the other devices connected to the network 150.

Figure 3:
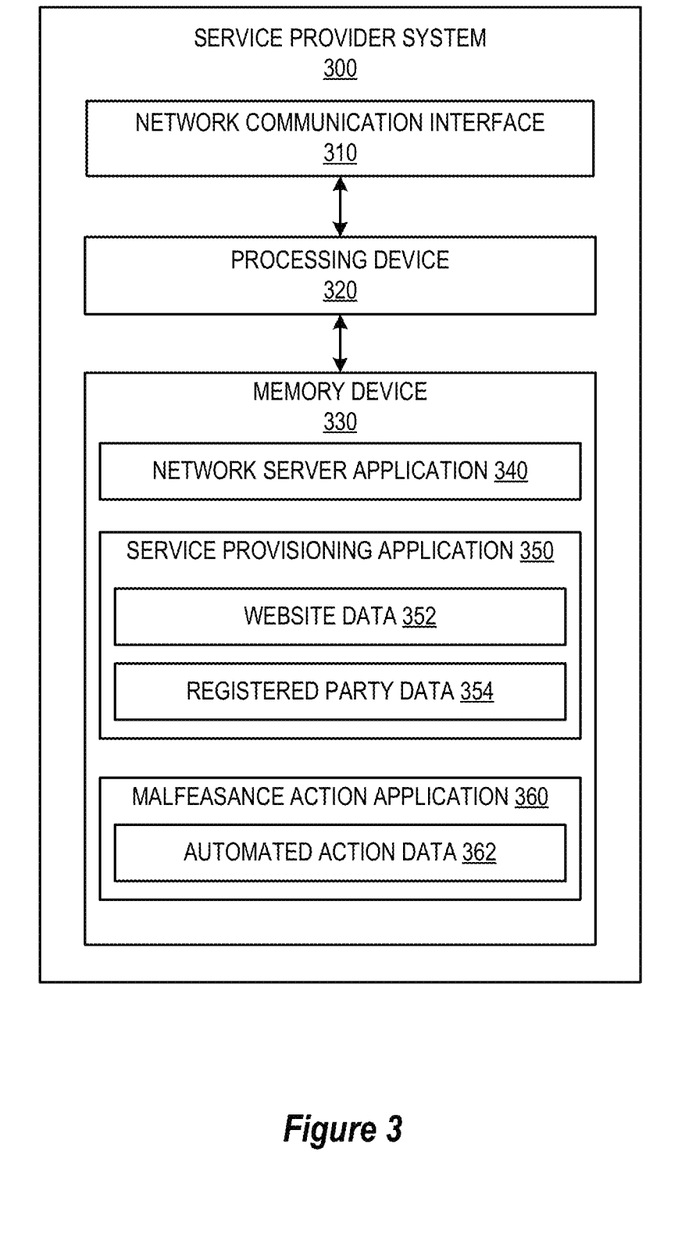
FIG. 3 provides a block diagram illustrating the system provider system of FIG. 1, in accordance with an embodiment of the invention.

FIG. 3 provides a block diagram illustrating the service provider system 300, in greater detail, in accordance with embodiments of the invention. As illustrated in FIG. 3, in one embodiment of the invention, the service provider system 300 includes one or more processing devices 320 operatively coupled to a network communication interface 310 and a memory device 330. In certain embodiments, the service provider system 300 is operated by a first entity, such as a financial institution, while in other embodiments, the service provider system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the service provider system 300 described herein. For example, in one embodiment of the service provider system 300, the memory device 330 includes, but is not limited to, a network server application 340, a service provisioning application 350 which includes website data 352 and registered party data 354, a malfeasance action application 360 which includes automated action data 362, and other computer-executable instructions or other data. The computer-executable program code of the network server application 340, the service provisioning application 350, and/or the malfeasance action application 360 may instruct the processing device 320 to perform certain logic, data-processing, and data-storing functions of the service provider system 300 described herein, as well as communication functions of the service provider system 300.

In one embodiment, the service provisioning application 350 includes website data 352 and registered party data 354. The website data 352 may comprise information, data, communication channels, permissions, authentications, user credentials, security questions, and the like that are needed or helpful in managing, hosting, or otherwise providing website services (or application services) such that the websites are accessible by users (e.g., the users 110). The registered party data 354 may include contact information (e.g., electronic mail information, physical address information, company name information, agent information, and the like) for each party or entity that owns the domain names for websites hosted by the service provider system 300. In this way, the service provider system 300 is able to utilize the service provisioning application 350 to host websites for registered users such that other users (e.g., the users 110) can access the websites, and such that the service provider system 300 is able to identify and contact registered users in the event a malfeasance associated with an associated website must be addressed.

In one embodiment, the malfeasance action application 360 includes automated action data 362 that may comprise instructions for analyzing received malfeasance reports or notifications to identify prompts for the automatic execution of certain malfeasance remediation actions. Furthermore, the automated action data 362 may include any information or data (e.g., contact information, server location information, website directory information, affected user information, notification information, and the like) necessary for automatically completing a prompted malfeasance remediation action to resolve a malfeasance of a web page hosted by the service provider system 300 in real time, or in near real time.

Figure 4:
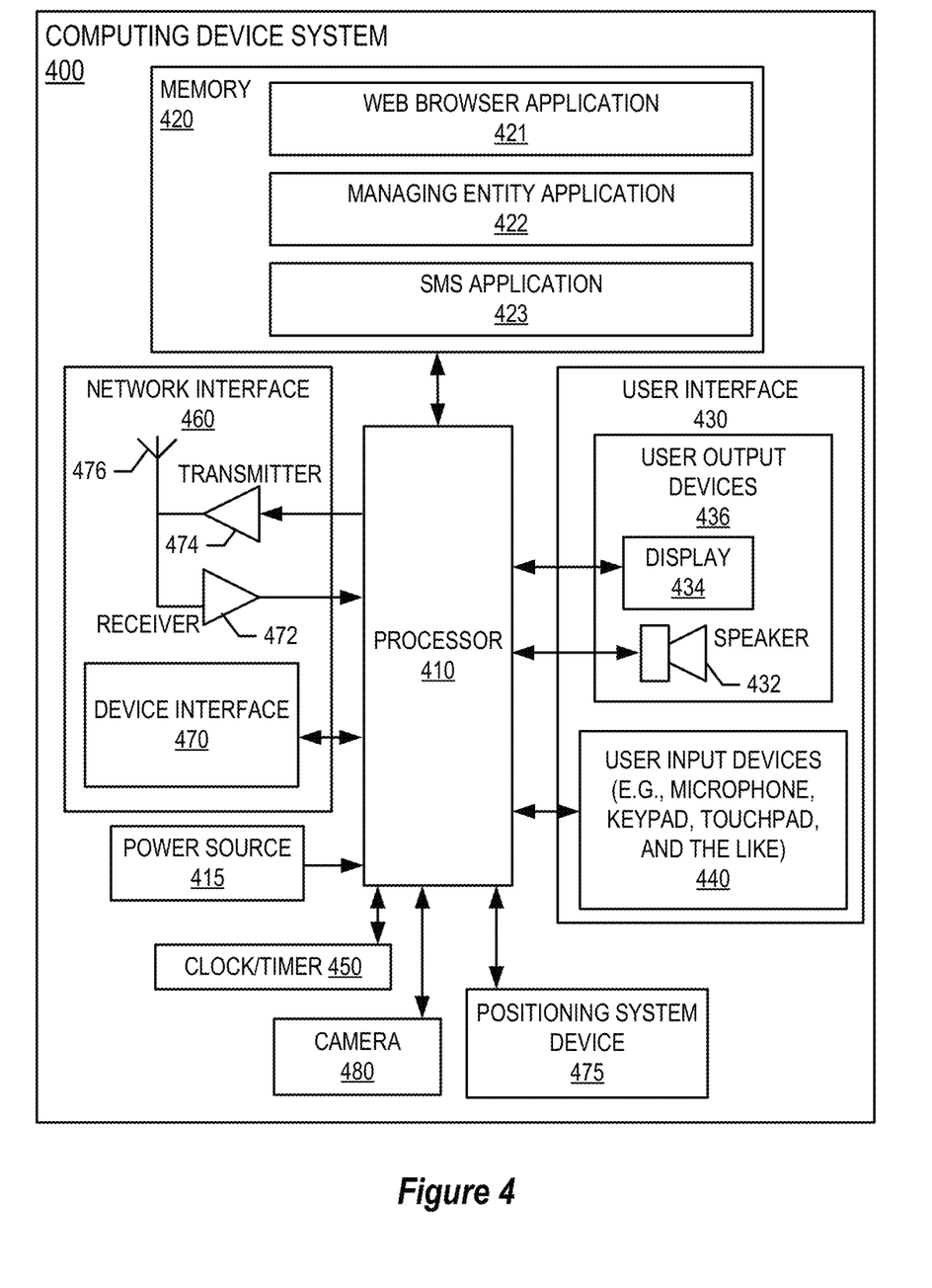
FIG. 4 provides a block diagram illustrating the computing device system of FIG. 1, in accordance with an embodiment of the invention.

FIG. 4 provides a block diagram illustrating a computing device system 400 of FIG. 1 in more detail, in accordance with embodiments of the invention. In some embodiments of the invention, the computing device system 400 is a mobile telephone, a laptop computer, a desktop computer, a workstation, a personal computer, or the like. However, it should be understood that these are merely illustrative of a few types of computing device systems 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 421 and/or a managing entity application 422 (or any other application provided by the managing entity system 200). These applications also typically instructions to a graphical user interface (GUI) on the display 430 that allows the user 110 to interact with the computing device system 400, the managing entity system 200, and/or other devices or systems. In other embodiments of the invention, the user 110 interacts with the managing entity system 200 or the resource accumulation system 400 via the web browser application 421 in addition to, or instead of, the managing entity application 422. In other embodiments, the user 110 may interact with the with the computing device system 400, the managing entity system 200, the service provider system 300, and/or other devices or systems via a mobile device application associated with the managing entity system (i.e., the managing entity application 423).

The memory 420 of the computing device system 400 may comprise a Short Message Service (SMS) application 423 configured to send, receive, and store data, information, communications, alerts, and the like via the network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
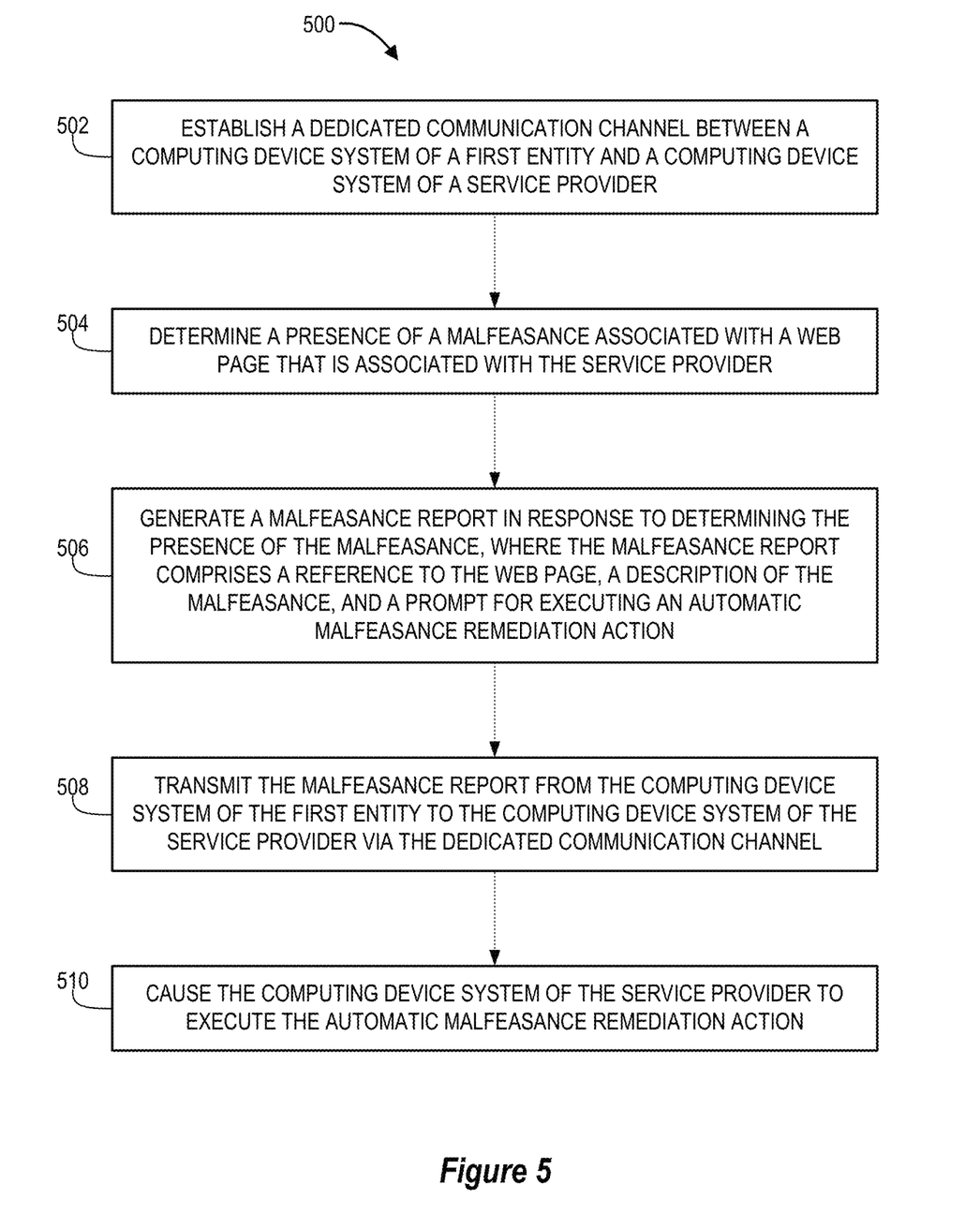
FIG. 5 provides a flowchart illustrating a process for automated malfeasance detection, in accordance with embodiments of the invention.

Referring now to FIG. 5, a flowchart is provided to illustrate one embodiment of a process 500 for automated malfeasance remediation, in accordance with embodiments of the invention. In some embodiments, the process 500 may include block 502, where the system establishes a dedicated communication channel between a first entity and a computing device system of a service provider. The first entity may be an entity that is associated with the system performing the steps in this process 500. In some embodiments, dedicated and secure communication channels are set up between the computing device system of the service provider and a number of individual entities that desire to have a dedicated and dependable method of contacting the service provider system to inform the service provider system of potential malfeasances and/or to cause the service provider system to automatically take actions to resolve malfeasance.

In some embodiments, the process 500 includes block 504, where the system determines a presence of a malfeasance associated with a web page that is associated with the service provider. As used herein, the term "malfeasance" may refer to the publishing of sensitive material, proprietary material, personal information, or any other violation of a service provider's terms of service for using a web page. The step of determining the presence of the malfeasance associated with the web page that is associated with the service provider may be executed automatically by the system (e.g., the managing entity system 200 of FIG. 1). For example, the system may detect a malfeasance associated with the web page that is associated with the service provider. To automatically detect the malfeasance within the web page, the system may monitor or otherwise analyze the web page to compare one or more features or elements of the web page to a set of rules associated with terms and conditions for the web page that are stored in a database (e.g., the service provider database 120 of FIG. 1).

The features or elements of the web page may comprise data fields, static images, animated images, audio, video, interactive text (e.g., dynamic hypertext markup language (DHTML)), interactive illustrations, buttons, hyperlinks, and other perceived forms or information, as well as any internal or hidden information including, but not limited to, comments, hyperlinked files, metadata, diagrammatic and style information, scripts, and the like.

The set of rules found in the database may comprise a set of terms and conditions for use of the web page or associated website, a set of regulations established by the service provider for identifying or otherwise detecting malfeasances within web pages, key words that indicate the presence of a malfeasance, key phrases that indicate the presence of a malfeasance, watermark or masking information that indicate the presence of misappropriated images or other multimedia, security code information that is associated with malfeasance, data formats that are indicative of sensitive information being displayed, and the like. As such, the system can identify information or features of a web page, compare that information (including the format of the information, a determined type of information, and the like) to the set of rules found in the database to determine whether the identified information matches a rule for detecting the presence of a malfeasance. If the identified information matches a rule of the set of rules, then the system can automatically tag, identify, or otherwise designate the identified information or feature as a malfeasance. In some embodiments, "matching" a rule may comprise a determination that the identified information or feature violates the rule.

By automatically identifying features or information on a web page that can be detected and designated as a malfeasance, the system is able to identify the presence of malfeasances within web pages much quicker than by human inspection. This quickness also permits the system to inspect or otherwise analyze many more web pages than manual inspection could accomplish. The overall reductions in the time to identify malfeasances in web pages (and the subsequent remediation steps described herein) are important in the field of information security, propriety rights, and other protections of sensitive information or potentially harmful actions, as hosted on web pages associated with a service provider. By quickly stopping the misappropriation of information or multimedia, or by halting an unauthorized or prohibited action that can occur on the web site, the system is able to significantly reduce the likelihood and/or duration of security concerns and dissemination of sensitive or proprietary information.

While the system may be able to detect at least some features of a web page as being associated with malfeasance, one or more rules may be more nuanced or merely present a possibility or likelihood of malfeasance when the feature matches and/or violates those rules. In such embodiments, the system may seek additional verification or additional information to establish a higher confidence level in the status of the feature as being a malfeasance. Therefore, in some embodiments, the system may transmit a request for confirmation of the presence of the malfeasance to a computing device of a malfeasance detection specialist. The malfeasance detection specialist may be an employee, contractor, affiliate, or the like of an entity managing or otherwise operating the system.

The request for confirmation may encompass a notification comprising a screen shot of the web page, a link to the web page, an indication of an identified potential malfeasance, the one or more rules that the system relied on to identify the potential malfeasance, location information for the malfeasance, and the like, such that the malfeasance detection specialist can have as much information about the potential malfeasance as possible to make a confirmation decision. Once the malfeasance detection specialist has determined that the identified potential malfeasance is in fact a malfeasance, the malfeasance detection specialist may transmit the confirmation back to the system. Therefore the system will receive the confirmation of the presence of the malfeasance from the computing device of the malfeasance detection specialist.

In other embodiments, the system may receive a notification from a user of the web page or from a malfeasance detection specialist. For example, the step of determining the presence of the malfeasance associated with the web page may comprise receiving a malfeasance notification from a computing device associated with a malfeasance detection specialist that identifies the presence of the malfeasance. This malfeasance report may comprise additional information regarding the location of the malfeasance within a web page, an identification and/or link to the web page, and the like.

Additionally, in some embodiments, the process 500 includes block 506, where the system generates a malfeasance report in response to determining the presence of the malfeasance, where the malfeasance report comprises a reference to the web page, a description of the malfeasance, and a prompt for executing an automatic malfeasance remediation action. At a minimum, this malfeasance report will be configured to notify the service provider entity associated with the service provider computing system of the presence of the malfeasance, and put the service provider entity on notice of a request to remove, delete, alter, or otherwise resolve the malfeasance.

The reference to the web page may comprise a link to the web page, a web page address, a trade name for the web page, a website from which the web page is located, a hyperlink to the web page, a link to a cached version of the web page, and the like. The description of the malfeasance may comprise a standard or agreed-upon name for the malfeasance type, a reference to a location of the malfeasance within the web page, a rule or procedure of the terms and conditions associated with the malfeasance, and the like. This description of the malfeasance may provide record-keeping information for subsequent review, information that a malfeasance action specialist can review to understand the identified malfeasance and/or take steps to resolve the malfeasance and the like.

The prompt for executing the automatic malfeasance remediation action may comprise instructions, computer executable code, commands that are executable by a malfeasance action application, and the like. As such, the prompt may be configured to trigger one or more actions of a receiving system, where the actions are automatically triggered when received by the receiving system or when a receiving system implements an initiating step that identifies and executes the prompt.

In some embodiments, the automatic malfeasance remediation action that the malfeasance report includes a prompt for comprises shutting down, blocking, or otherwise disabling the web page or an entire website associated with the web page. The automatic malfeasance remediation action may additionally or alternatively comprise transmitting a notification of the malfeasance to a computing device system of a government agency and/or to computing devices of one or more users that have been determined to have potentially been affected by the malfeasance.

In some embodiments, the system identifies a registered party and contact information for the registered party, or prompts the receiving system (e.g., the service provider system) to identify a registered party, where the registered party is an entity that owns a domain name associated with the web page, that has ownership or management rights or duties for the web page, or otherwise is responsible for content and features of the web page. In such embodiments, the automatic malfeasance remediation action may comprise identifying all websites associated with (e.g., owned by) the registered party, and shutting down, blocking, or otherwise disabling the websites associated with the registered party.

Additionally or alternatively, the automatic malfeasance remediation action may comprise transmitting a cease and desist notification (e.g., letter) to a computing device of the registered party of the web page. The cease and desist notification may comprise information regarding the malfeasance (e.g., location, type of malfeasance, reason for violation of terms and conditions of the service provider, a reference to proprietary information like copyrighted material associated with the malfeasance, and the like) that would inform the registered party of the justification for the cease and desist notification that is being sent.

The detected malfeasance may, in some embodiments, be considered a likelihood of malfeasance, or an expectation of malfeasance that can be overcome through an explanation, proof of a license, or another proof of authorization for the feature or element of the web page that has been tagged as potentially a malfeasance. Therefore, the automatic malfeasance remediation action may comprise transmitting, to the computing device of the registered party, a request for an authorization or an explanation regarding the malfeasance from the registered party of the web page.

In some embodiments, the remediation of a malfeasance includes or requires an elimination of data, a removal of information or multimedia, a destruction of information, or some other action that must be completed to confirm that the malfeasance has been resolved. In such embodiments, the automatic malfeasance remediation action may comprise transmitting, to the computing device of the registered party, a request for proof that the malfeasance has been fully remediated.

In addition to the reference to the web page, the description of the malfeasance, and the automatic malfeasance remediation action, the malfeasance report may further comprise one or more additional elements including, but not limited to, a time and date that the presence of the malfeasance was determined, a time and date that the malfeasance began, an image or screen shot of the web page associated with the malfeasance, a justification notification for reporting the malfeasance, and one or more suggested or requested malfeasance remediation actions.

The time and date that the presence of the malfeasance was determined may be identified through time-stamp information of a malfeasance detection application, based on when the malfeasance detection application found the presence of the malfeasance. The time and date that the malfeasance began may be identified or determined based on web page monitoring logs of the malfeasance detection application (e.g., a determination of when the feature or element of the web page now identified as a malfeasance was added or removed from the web page), and/or by comparing a plurality of cached versions of the web page to identify at least a time and date range in which the element or feature of the web page that has been designated as a malfeasance first could be considered a malfeasance (e.g., when added, when removed, when changed, and the like).

The image or screen shot of the web page associated with the malfeasance may comprise a single image (e.g., in a portable document format), a plurality of images (e.g., at least a "before" and an "after" view of the web page to illustrate differences in the web pages that are associated with the malfeasance), an enlarged image of the web page that better illustrates the malfeasance, an image of the web page with a highlighted area around the region of the malfeasance on the web page, an image of the web page with an annotation of the type of malfeasance, or the like.

The justification notification for reporting the malfeasance may comprise a reference to a terms and conditions (or other agreement) section that the malfeasance allegedly violates, a reference to a legal rule or regulation that the malfeasance allegedly violates, an explanation of why the feature or element of the web page was determined or otherwise designated to be a malfeasance, a reference to a rule established by the service provider that the feature or element of the web page has been determined to violate to designated as a malfeasance, or the like.

The one or more requested malfeasance remediation actions may include the automatic malfeasance action or any other action that would resolve, fix, end, counteract, report, or otherwise remediate the detected malfeasance. These requested malfeasance remediation actions may be configured to inform a malfeasance action specialist associated with the service provider (e.g., employed by the service provider entity) about remediation steps that the system has determined to be helpful or required for addressing the detected malfeasance. For example, the malfeasance report may include both an automatic malfeasance remediation action that is configured to automatically shut down a web page containing the malfeasance, and a requested malfeasance remediation action requesting a malfeasance action specialist to report the malfeasance incident to a regulatory agency.

The process 500 may also include block 508, where the system transmits the malfeasance report from the computing device system of the first entity to the computing device system of the service provider via the dedicated communication channel. By transmitting the malfeasance report directly to the computing system of the service provider, the system is able to quickly achieve direct and secure communication to the service provider, without having to search records or online sources to identify which individuals to contact, and whether to contact through a phone connection, by electronic mail, by fax, and/or the like.

By simplifying the malfeasance notification process, the system ensures the notifications are sent to the proper individuals and in the proper manner, and allows the service provider systems to take immediate or near-immediate actions to remediate the detected malfeasance. As most malfeasances continuously and/or repeatedly cause issues or security concerns, the amount of time it takes to remediate a malfeasance has a direct impact on the severity and extent of the malfeasance.

Finally, the process 500 may continue to block 518, where the system causes the computing device system of the service provider to execute the automatic malfeasance remediation action in response to the computing device system of the service provider receiving the malfeasance report. This step may be accomplished by the automatic malfeasance remediation action automatically triggering the computing device system of the service provider to execute the malfeasance remediation action (e.g., shutting down the web page, transmitting a notification of the malfeasance to a computing device system of a government agency, or the like). In other embodiments, the computing device system of the service provider may process the malfeasance report to identify the prompt and enter the prompt of the automatic malfeasance remediation action in a malfeasance action application.

As noted above, there are multiple malfeasance remediation actions that the computing device system of the service provider is caused to execute to resolve, mitigate, or otherwise remediate. For example, in embodiments where the automatic malfeasance remediation action comprises shutting down the web page or associated website, the computing device system of the service provider may be caused to access a web page or website server system, identify the web page or website associated with the malfeasance, and block, terminate, freeze, close, or otherwise shut down the web page and/or website through the web page or website server system.

In embodiments where the automatic malfeasance remediation action comprises communicating with the registered party, the computing device system of the service provider may compare information regarding the web page (e.g., address) to a database of registered parties and their associated websites, including web pages, to identify the registered party and contact information (e.g., email address, physical address, and the like) for the registered party. In this way, the computing device system of the service provider may, once prompted through the malfeasance report, may transmit a cease and desist notification to a computing device of the registered party of the web page.

Additionally or alternatively, the computing device system of the service provider may, once prompted through the malfeasance report, may transmit a request to the computing device of the registered party for an authorization or an explanation regarding the malfeasance from the registered party of the web page.

Furthermore, the computing device system of the service provider may, once prompted through the malfeasance report, may transmit, to the computing device of the registered party, a request for proof that the malfeasance has been fully remediated. In some embodiments, the system may additionally be configured to receive the proof that the malfeasance has been fully remediated, compare the proof to a database of acceptable proof to determine whether the feature or element is still considered a malfeasance, and either remove the malfeasance element or clear the element of malfeasance.

In embodiments where the automatic malfeasance remediation action comprises transmitting a notification of the malfeasance to a computing device system of a government agency (e.g., a regulatory agency, a law enforcement agency, and the like), the computing device system of the service provider may, upon being prompted by the malfeasance response, automatically transmit the notification of the malfeasance to the computing device system of the government agency.

In some embodiments, one or more users have already accessed the web page, used the web page, been contacted by the web page, or otherwise been affected by the web page prior to the malfeasance being remediated. In such embodiments, the computing device system of the service provider, upon being prompted, may identify the one or more users that have accessed the web page since the malfeasance was identified or originally began. For example, the computing device system of the service provider may identify user log-in time-stamps for the web page, electronic mail communications from the web page to certain electronic mail addresses of the one or more users, text messages from the web page to certain phone numbers of the one or more users, and/or the like. The computing device system of the service provider may then be configured to transmit messages, electronic mail, phone calls, faxes, and the like to the one or more affected users to notify the affected users of the malfeasance.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automated malfeasance remediation, the system comprising:
   a memory device; and
   a processing device operatively coupled to the memory device, wherein the processing device is configured to execute computer-readable program code to:
   establish a dedicated communication channel between a computing device system of a first entity and a computing device system of a service provider;
   determine a presence of a malfeasance associated with a web page that is associated with the service provider;
   generate a malfeasance report in response to determining the presence of the malfeasance, where the malfeasance report comprises a reference to the web page, a description of the malfeasance, and a prompt for executing an automatic malfeasance remediation action, and wherein the malfeasance report additionally comprises:
   a time and date that the presence of the malfeasance was determined;
   a time and date that the malfeasance began;
   an image or screen shot of the web page associated with the malfeasance;

a justification notification for reporting the malfeasance; and one or more requested malfeasance remediation actions, including the automatic malfeasance remediation action;

transmit the malfeasance report from the computing device system of the first entity to the computing device system of the service provider via the dedicated communication channel; and in response to the computing device system of the service provider receiving the malfeasance report, cause the computing device system of the service provider to execute the automatic malfeasance remediation action.

2. The system of claim 1, wherein determining the presence of the malfeasance associated with the web page that is associated with the service provider comprises detecting the malfeasance associated with the web page that is associated with the service provider.

3. The system of claim 2, wherein detecting the malfeasance associated with the web page that is associated with the service provider comprises:

comparing one or more features of the web page to a set of rules associated with terms and conditions for the web page that are stored in a database;

determining that a first feature of the web page violates at least one rule of the set of rules; and designating the first feature of the web page as the malfeasance.

4. The system of claim 2, wherein the processing device is further configured to execute computer-readable program code to:

transmit a request for confirmation of the presence of the malfeasance to a computing device of a malfeasance detection specialist; and receive the confirmation of the presence of the malfeasance from the computing device of the malfeasance detection specialist.

5. The system of claim 1, wherein determining the presence of the malfeasance associated with the web page that is associated with the service provider comprises receiving a malfeasance notification from a computing device associated with a malfeasance detection specialist that identifies the presence of the malfeasance.

6. The system of claim 1, wherein the automatic malfeasance remediation action comprises at least one of:

shutting down the web page;

shutting down a website associated with the web page;

shutting down all websites associated with a registered party of the web page;

transmitting a cease and desist notification to a computing device of the registered party of the web page;

transmitting, to the computing device of the registered party, a request for an authorization or an explanation regarding the malfeasance from the registered party of the web page;

transmitting, to the computing device of the registered party, a request for proof that the malfeasance has been fully remediated;

transmitting a notification of the malfeasance to a computing device system of a government agency; and transmitting the notification of the malfeasance to a computing device of a user of the web page.

7. A computer program product for automated malfeasance remediation, the computer program product comprising at least one non-transitory computer readable medium comprising computer readable instructions, the instructions comprising instructions for:

establishing a dedicated communication channel between a computing device system of a first entity and a computing device system of a service provider;

determining a presence of a malfeasance associated with a web page that is associated with the service provider;

generating a malfeasance report in response to determining the presence of the malfeasance, where the malfeasance report comprises a reference to the web page, a description of the malfeasance, and a prompt for executing an automatic malfeasance remediation action, and wherein the malfeasance report additionally comprises:

a time and date that the presence of the malfeasance was determined;

a time and date that the malfeasance began;

an image or screen shot of the web page associated with the malfeasance;

a justification notification for reporting the malfeasance; and one or more requested malfeasance remediation actions, including the automatic malfeasance remediation action;

transmitting the malfeasance report from the computing device system of the first entity to the computing device system of the service provider via the dedicated communication channel; and in response to the computing device system of the service provider receiving the malfeasance report, causing the computing device system of the service provider to execute the automatic malfeasance remediation action.

8. The computer program product of claim 7, wherein determining the presence of the malfeasance associated with the web page that is associated with the service provider comprises detecting the malfeasance associated with the web page that is associated with the service provider.

9. The computer program product of claim 8, wherein detecting the malfeasance associated with the web page that is associated with the service provider comprises:

comparing one or more features of the web page to a set of rules associated with terms and conditions for the web page that are stored in a database;

determining that a first feature of the web page violates at least one rule of the set of rules; and designating the first feature of the web page as the malfeasance.

10. The computer program product of claim 8, wherein the computer readable instructions further comprise instructions for:

transmitting a request for confirmation of the presence of the malfeasance to a computing device of a malfeasance detection specialist; and receiving the confirmation of the presence of the malfeasance from the computing device of the malfeasance detection specialist.

11. The computer program product of claim 7, wherein determining the presence of the malfeasance associated with the web page that is associated with the service provider comprises receiving a malfeasance notification from a computing device associated with a malfeasance detection specialist that identifies the presence of the malfeasance.

12. The computer program product of claim 7, wherein the automatic malfeasance remediation action comprises at least one of:

shutting down the web page;

shutting down a website associated with the web page;
shutting down all websites associated with a registered party of the web page;
transmitting a cease and desist notification to a computing device of the registered party of the web page;
transmitting, to the computing device of the registered party, a request for an authorization or an explanation regarding the malfeasance from the registered party of the web page;
transmitting, to the computing device of the registered party, a request for proof that the malfeasance has been fully remediated;
transmitting a notification of the malfeasance to a computing device system of a government agency; and
transmitting the notification of the malfeasance to a computing device of a user of the web page.

13. A computer implemented method for automated malfeasance remediation, said computer implemented method comprising:
providing a computing device system comprising a computer processing device and a non-transitory computer readable medium, where the computer readable medium comprises configured computer program instruction code, such that when said instruction code is operated by said computer processing device, said computer processing device performs the following operations:
establish a dedicated communication channel between a computing device system of a first entity and a computing device system of a service provider;
determine a presence of a malfeasance associated with a web page that is associated with the service provider;
generate a malfeasance report in response to determining the presence of the malfeasance, where the malfeasance report comprises a reference to the web page, a description of the malfeasance, and a prompt for executing an automatic malfeasance remediation action, and wherein the malfeasance report additionally comprises:
a time and date that the presence of the malfeasance was determined;
a time and date that the malfeasance began;
an image or screen shot of the web page associated with the malfeasance;
a justification notification for reporting the malfeasance; and
one or more requested malfeasance remediation actions, including the automatic malfeasance remediation action;
transmit the malfeasance report from the computing device system of the first entity to the computing device system of the service provider via the dedicated communication channel; and
in response to the computing device system of the service provider receiving the malfeasance report, cause the computing device system of the service provider to execute the automatic malfeasance remediation action.

14. The computer implemented method of claim 13, wherein determining the presence of the malfeasance associated with the web page that is associated with the service provider comprises detecting the malfeasance associated with the web page that is associated with the service provider.

15. The computer implemented method of claim 14, wherein detecting the malfeasance associated with the web page that is associated with the service provider comprises:
comparing one or more features of the web page to a set of rules associated with terms and conditions for the web page that are stored in a database;
determining that a first feature of the web page violates at least one rule of the set of rules; and
designating the first feature of the web page as the malfeasance.

16. The computer implemented method of claim 13, wherein determining the presence of the malfeasance associated with the web page that is associated with the service provider comprises receiving a malfeasance notification from a computing device associated with a malfeasance detection specialist that identifies the presence of the malfeasance.

17. The computer implemented method of claim 13, wherein the automatic malfeasance remediation action comprises at least one of:
shutting down the web page;
shutting down a website associated with the web page;
shutting down all websites associated with a registered party of the web page;
transmitting a cease and desist notification to a computing device of the registered party of the web page;
transmitting, to the computing device of the registered party, a request for an authorization or an explanation regarding the malfeasance from the registered party of the web page;
transmitting, to the computing device of the registered party, a request for proof that the malfeasance has been fully remediated;
transmitting a notification of the malfeasance to a computing device system of a government agency; and
transmitting the notification of the malfeasance to a computing device of a user of the web page.

* * * * *